Feb. 24, 1970  J. A. MARTUCCI ET AL  3,496,629
METHOD FOR SECURING TUBES TO A TUBE SHEET
Filed March 18, 1968

INVENTOR.
JOHN A. MARTUCCI
JOHN C. TOBIN
BY
Robert L. Olson
ATTORNEY

United States Patent Office 3,496,629
Patented Feb. 24, 1970

3,496,629
METHOD FOR SECURING TUBES TO A TUBE SHEET
John A. Martucci, Hartford, Conn., and John C. Tobin, Richland, Wash., assignors to Combustion Engineering, Inc., Windsor, Conn., a corporation of Delaware
Filed Mar. 18, 1968, Ser. No. 713,674
Int. Cl. B23k 31/02
U.S. Cl. 29—471.1                 2 Claims

ABSTRACT OF THE DISCLOSURE

A method of securing tubes to a tube sheet comprising the steps of securing a ring of brazing material to the tubes at a predetermined distance from their ends, inserting the tubes into countersunk holes in the tube sheet until the rings of brazing material contact the bottom of the countersinks, and then heat treating the assembly at a sufficiently high temperature to melt the brazing material so as to fill the voids between the tubes and the tube sheet.

Background of the invention

In securing tubes to a tube sheet, for use for example in a nuclear heat exchanger, or other tube and shell heat exchanger, it is necessary that the joints be pressure tight. One present method of accomplishing this is to insert the tubes into openings in the tube sheet, and mechanically expanding the tubes into tight fitting engagement with the tube sheet. This operation is not only costly and time consuming but on occasion a slight crevice or pocket remains between a tube and the tube sheet. Corrosion can attack these crevises.

Summary of the invention

In accordance with our invention a method of securing tubes to a tube sheet is provided comprising the steps of securing a ring of brazing material to the tubes at a predetermined distance from their ends, inserting the tubes into countersunk holes in the tube sheet until the brazing material contacts the bottom of the countersinks, forming a seal weld between the end of each tube and the tube sheet, and then heat treating the assembly at a sufficiently high temperature to melt the brazing material so as to fill the voids between the tubes and tube sheet.

Description of the preferred embodiment

Figures 1, 2:
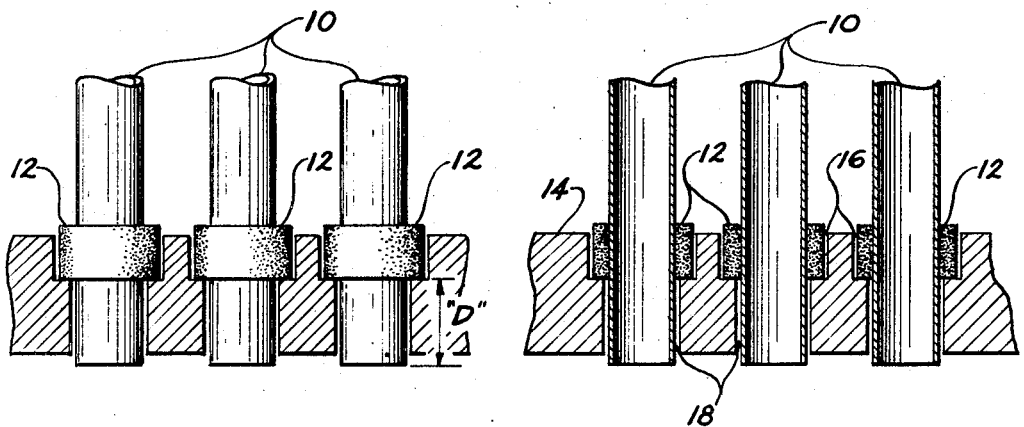
FIGURE 1 shows a plurality of tubes having rings of brazing material crimped thereon at predetermined distances from their ends.
FIGURE 2 shows these tubes assembled in countersunk holes in the tube sheet.

Looking now to FIGURE 1, a plurality of tubes 10, which are to be secured to a tube sheet, are illustrated. A ring of brazing material 12 is crimped onto each tube, at a predetermined distance D from the ends of the tubes. The distance D is determined such that the ends of the tubes 10 will protrude slightly through the tube sheet they are to be affixed to (see FIGURE 2).

The tubes 10 with the brazing material secured thereto are next inserted into holes or openings 18, in a tube sheet 14 (FIGURE 2). The holes 18 are countersunk, and contain enlarged openings 16, into which the brazing material 12 is positioned. The bottom of the brazing material 12 coming into contact with the bottom of the countersinks 16 determines how far the tubes 10 extend into tube sheet 14.

After the tubes have been positioned in the holes of the tube sheet, a seal weld 20 is made between each end of the tubes 10 and the tube sheet 14. This seal weld is necessary when the finished tube and tube sheet assembly is to be subjected to high pressure and high temperature conditions during operation. The seal weld strengthens the connections between the tubes and tube sheet.

Figures 3, 4:
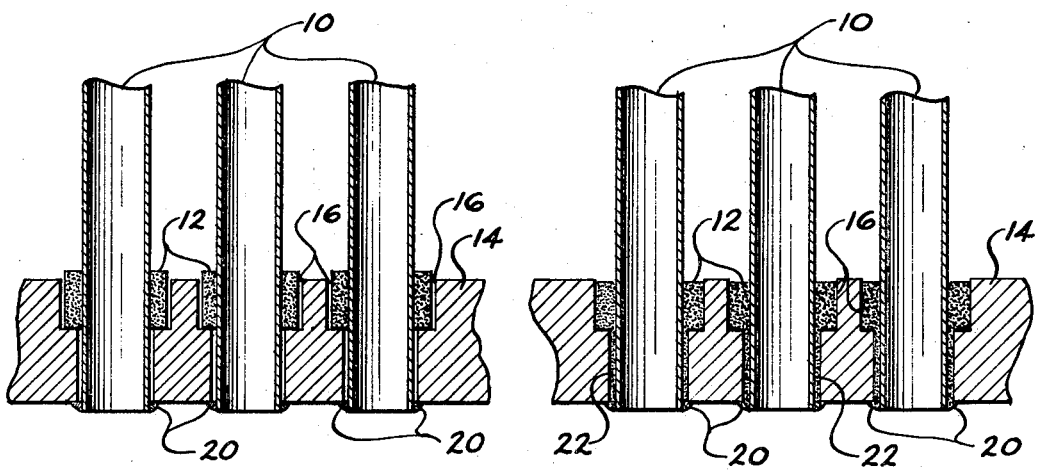
FIGURE 3 illustrates the tube and tube sheet assembly with a seal weld formed between the end of each tube and the tube sheet.
FIGURE 4 shows the finished assembly, after it has been heat treated.

When all of the seal welds have been finished, the entire assemblage is moved into a heat treating furnace (not shown). The heat treatment will not only stress relief of the assembly, but will melt the brazing material 12, causing it to run down into and fill the space between the tubes and tube sheet. When the assembly is removed from the heat treating furnace, the spaces between the tubes 10 and the tube sheet 14 will be completely filled with brazing material, as seen at 22 in FIGURE 4. It should be pointed out that the heat treating temperature must be sufficiently high to melt the brazing material. Also, the brazing alloy should have a melting temperature which is several hundred degrees Fahrenheit above any temperature the tube and tube sheet assembly will be exposed to when later put into operation.

In some circumstances, where the finished tube and tube sheet assembly is not going to be subjected to extremely high pressures, the added strength of the seal weld may be dispensed with. Thus, the step shown in FIGURE 3 of placing welds 20 can be omitted, and a temporary backing means can be placed around the bottom of each tube while the brazing material is molten during the heat treatment. In the event that there is a very close tolerance between the tubes and the tube holes, even the backing means can be dispensed with. The brazing material would then flow by means of capillary action, and would not flow out of the void between the tubes and tube holes even if not supported at the bottom.

While we have illustrated and described a preferred embodiment of our invention, it will be understood that minor changes in construction and arrangement of parts may be made without departing from the spirit and scope of the invention as claimed. It is therefore intended that all matter contained in the description or shown in the accompanying drawings be interpreted as illustrative and not in a limiting sense.

What we claim is:
1. The method of securing a tube to a tube sheet comprising the steps of forming a hole which extends completely through the tube sheet, the hole having an enlarged annular portion on one side of the tube sheet, securing a ring of brazing material around the tube at a predetermined distance greater than zero from one end thereof, inserting said one end of the tube into the hole until the ring of brazing material contacts the bottom of the annular portion, applying heat to the brazing material until it is melted, and fills the void between the tube and tube sheet wall.
2. The method of securing a plurality of tubes to a tube sheet comprising the steps of forming a plurality of holes which extend completely through the tube sheet, the holes having an enlarged annular portion on one side of the tube sheet, securing a ring of brazing material around each tube at a predetermined distance greater than zero from one end of the tubes, inserting said one end of each tube into the holes until the rings of brazing material contact the bottom of the annular portions, heat treating the assembled tubes and tube sheet, the temperature of the heat treatment being sufficient to melt the brazing material, thus filling the voids between the tubes and the tube sheet wall.

References Cited

UNITED STATES PATENTS

| 2,251,709 | 8/1941 | Klein | 29—628 |
| 3,025,596 | 3/1962 | Ward et al. | 29—471.1 |
| 3,079,674 | 3/1963 | Shortt. | |
| 3,101,531 | 8/1963 | Roseberry | 29—474.4 |
| 3,105,293 | 10/1963 | Skinner et al. | 29—474 |
| 3,188,720 | 6/1965 | Husni | 29—471.1 XR |

JOHN F. CALDWELL, Primary Examiner

R. B. LAZARUS, Assistant Examiner

U.S. Cl. X.R.

29—502